United States Patent
Bruno et al.

(10) Patent No.: US 10,778,562 B2
(45) Date of Patent: Sep. 15, 2020

(54) PATH COMPUTATION IN A MULTI-TENANT NETWORK

(71) Applicant: Telefonaktiebolaget LM Ericsson (publ), Stockholm (SE)

(72) Inventors: Gianmarco Bruno, Genoa (IT); Daniele Ceccarelli, Stockholm (SE); Francesco Lazzeri, Genoa (IT); Jeroen Nijhof, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 134 days.

(21) Appl. No.: 15/764,389

(22) PCT Filed: Oct. 12, 2015

(86) PCT No.: PCT/EP2015/073599
§ 371 (c)(1),
(2) Date: Mar. 29, 2018

(87) PCT Pub. No.: WO2017/063667
PCT Pub. Date: Apr. 20, 2017

(65) Prior Publication Data
US 2018/0278511 A1    Sep. 27, 2018

(51) Int. Cl.
*H04L 12/751* (2013.01)
*H04L 12/715* (2013.01)
*H04L 12/911* (2013.01)

(52) U.S. Cl.
CPC .............. *H04L 45/02* (2013.01); *H04L 45/64* (2013.01); *H04L 47/72* (2013.01)

(58) Field of Classification Search
None
See application file for complete search history.

(56) References Cited

U.S. PATENT DOCUMENTS 8,787,154 B1 * 7/2014 Medved ............... H04L 45/64
                                                         370/225
9,450,817 B1 * 9/2016 Bahadur ............. H04L 45/64
(Continued)

FOREIGN PATENT DOCUMENTS

WO    2013020126 A1    2/2013
WO    2016124228 A1    8/2016

OTHER PUBLICATIONS

Ash, J. et al., "Path Computation Element (PCE) Communication Protocol Generic Requirements", The Internet Society, Network Working Group, RTC 4657, Sep. 2006, pp. 1-21.
(Continued)

Primary Examiner — Kenny S Lin
(74) Attorney, Agent, or Firm — Murphy, Bilak & Homiller, PLLC

(57) ABSTRACT

A path computation method for use by a control entity (20) of a tenant (11) in a multi-tenant communications network (40) receives a request for computation of a path in the communications network (40) and obtains a current virtual topology of the communications network from a shared topology store (31) which is shared by the tenants. The virtual topology is a topology of the communications network which is available for use by the tenant (11). The virtual topology is used to service the request. The method may create the path. The path computation may be in respect of a future time interval.

19 Claims, 15 Drawing Sheets

(56) References Cited

U.S. PATENT DOCUMENTS

| | | | | |
|---|---|---|---|---|
| 2014/0025816 A1* | 1/2014 | Otani | ............... | G06F 9/5072 |
| | | | | 709/225 |
| 2015/0139238 A1* | 5/2015 | Pourzandi | ............... | H04L 45/42 |
| | | | | 370/392 |
| 2015/0195178 A1* | 7/2015 | Bhattacharya | ........ | H04L 45/745 |
| | | | | 718/1 |
| 2015/0215200 A1* | 7/2015 | Bottari | ................ | H04Q 3/0079 |
| | | | | 370/228 |
| 2016/0028625 A1* | 1/2016 | Hari | ................ | H04L 45/74 |
| | | | | 370/392 |
| 2016/0087846 A1* | 3/2016 | Prasad | ............... | H04L 41/0806 |
| | | | | 398/45 |
| 2017/0099211 A1* | 4/2017 | Iovanna | ................ | H04L 49/70 |

OTHER PUBLICATIONS

Drutskoy, Dmitry et al., "Scalable Network Virtualization in Software-Defined Networks", IEEE Internet Computing; Institute of Electrical and Electronic Engineers, US, vol. 17, No. 2, Mar. 1, 2013, pp. 20-27.

Farrel, A. et al., "A Path Computation Element (PCE)—Based Architecture", IETF RFC-4655, Aug. 2006, pp. 1-40.

Theodoras, Jim, "Transport SDN Takes Shape", The DataCenter Journal, Mar. 20, 2014, pp. 1-3.

"5G Systems", Ericsson White Paper, Uen 284 23-3244, Jan. 2015, pp. 1-14.

"Optical Transport Use Cases", Open Networking Foundation; Optical Transport Working Group; ONF TF-509, 2014, pp. 1-37.

* cited by examiner

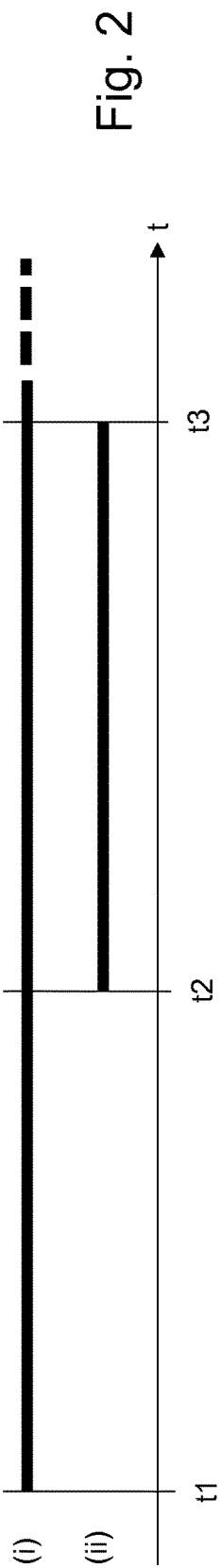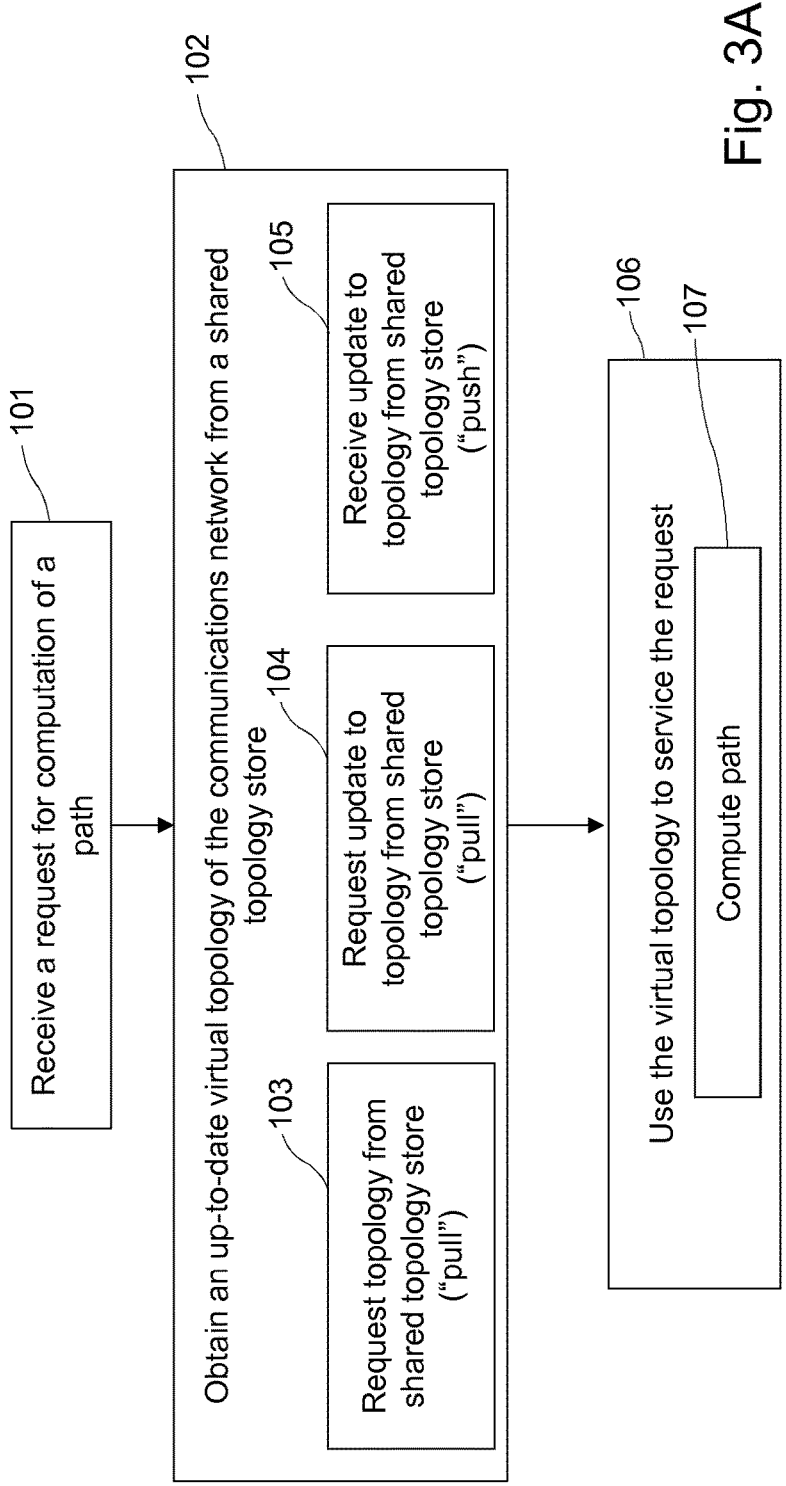

PATH COMPUTATION IN A MULTI-TENANT NETWORK

TECHNICAL FIELD

The present disclosure is generally related to methods of path computation, to apparatus for path computation and to programs for carrying out such methods.

BACKGROUND

It is known to provide communications networks having path computation elements (PCE) for computing which path resources (for example links, nodes, frequency or time slots) to select for a new path through the network. A PCE has been defined as an entity (component, application, or network node) that is capable of computing a network path or route based on a network graph and applying computational constraints. A Path Computation Client (PCC) is an entity which requests a path computation to be performed by the PCE. The PCC and PCE in a typical example communicate through the PCE communication Protocol (PCEP). PCEP operations have been defined to enable effective PCE-based path computations and, in turn, the effective use of network resources. A PCE-based architecture is described in Internet Engineering Task Force (IETF) document RFC 4655 and the PCE communication Protocol is described in RFC 4657.

Software Defined Networking (SDN) is an emerging architecture which decouples the network control and forwarding functions, enabling the network control to become directly programmable and the underlying infrastructure to be abstracted for applications and network services. A consequence of this agility and programmability is the possibility of having applications running on top of the transport SDN controller which automatically requests network resources without manual intervention.

One possible type of network has a plurality of tenants. For example, a large telecom provider has a network which serves a plurality of smaller telecom providers. In this disclosure this type of network is called a multi-tenant network. The network can have a plurality of SDN controllers and, as a consequence, a plurality of different PCEs.

The present disclosure seeks to provide an alternative way of operating a multi-tenant network.

SUMMARY

An aspect of the disclosure provides a path computation method for use by a control entity of a tenant in a communications network having a plurality of tenants. The communications network has a topology of path resources usable for implementing paths. The method comprises receiving a request for computation of a path in the communications network. The method comprises obtaining a current virtual topology of the communications network from a shared topology store which is shared by the plurality of tenants. The method comprises using the virtual topology to service the request. The virtual topology is a topology of the communications network which is available for use by the tenant.

Obtaining a current virtual topology of the communications network may comprise requesting a current virtual topology from the shared topology store.

Obtaining a current virtual topology of the communications network may comprise requesting an update to the virtual topology from the shared topology store, and updating a locally stored virtual topology with the update.

Obtaining a current virtual topology of the communications network may comprise receiving an update to the virtual topology pushed from the shared topology store, and updating a locally stored virtual topology with the update.

The request for computation of a path in the communications network may be a request in respect for a path at a future time interval and the current virtual topology may be obtained for the future time interval.

The method may comprise locally storing a virtual topology of the communications network. The term "locally storing" means storing the virtual topology separately from the shared topology store. The term "locally storing" may store the virtual topology data at the control entity (e.g. at the SDN controller) or at a physical location where it is accessible by the control entity of the tenant. The method may comprise determining if the locally stored virtual topology of the communications network is current. The method may comprise obtaining a current virtual topology of the communications network from the shared topology store if it is determined that the locally stored virtual topology is not current.

The method may comprise initiating creation of the computed path in the communications network.

The initiating creation of the computed path may comprise reserving resources for the computed path.

The initiating creation of the computed path may comprise obtaining a current virtual topology of the communications network from the shared topology store. The method may comprise checking, using the virtual topology, that the computed path is still available.

The initiating creation of the computed path may comprise determining if the locally stored virtual topology of the communications network is current. The method may comprise using the locally stored virtual topology of the communications network if it is determined that the locally stored virtual topology is current. The method may comprise obtaining a current virtual topology of the communications network from the shared topology store if it is determined that the locally stored virtual topology is not current.

The method may comprise notifying the shared topology store of the resources used by the created path.

The request for computation of a path in the communications network may be a request in respect of a path at a future time interval and the initiating creation of the path may reserve resources for the path at the future time interval.

The virtual topology may be a sub-set of the topology of the communications network.

The control entity may be a software-defined networking controller for the tenant.

An aspect of the disclosure provides a control apparatus for path computation in a communications network having a plurality of tenants. The communications network has a topology of path resources usable for implementing paths. The apparatus comprises means for receiving a request for computation of a path in the communications network. The apparatus comprises means for obtaining a current virtual topology of the communications network from a shared topology store which is shared by the plurality of tenants. The apparatus comprises means for using the virtual topology to service the request. The virtual topology is a topology of the communications network which is available for use by the tenant.

An aspect of the disclosure provides a control apparatus for path computation in a communications network having a plurality of tenants. The communications network has a topology of path resources usable for implementing paths. The apparatus comprises a processor and a memory, the memory containing instructions that when executed by the processor cause the processor to receive a request for computation of a path in the communications network. The instructions cause the processor to obtain a current virtual topology of the communications network from a shared topology store which is shared by the plurality of tenants. The instructions cause the processor to use the virtual topology to service the request. The virtual topology is a topology of the communications network which is available for use by the tenant.

The control apparatus may be in the form of a software-defined networking controller for the tenant.

An aspect of the disclosure provides a communications system comprising a communications network having a topology of path resources usable for implementing paths, the communications network being usable by a plurality of tenants, a shared topology store and a control apparatus as defined in the claims.

An advantage of at least one example is allowing the plurality of tenants to compute paths in the network without the need to communicate between control entities (e.g. PCEs) of tenants, and without the need to use a centralised PCE. The shared topology store maintains current topology data for each tenant.

An advantage of at least one example is allowing the plurality of tenants to compute paths in the network without communicating an onerous amount of data between control entities.

The network can be a single-layer or multi-layer transport network using one or more of the following technologies: Wavelength Division Multiplexing (WDM), Dense Wavelength Division Multiplexing (DWDM), Optical Transport Network (OTN), Internet Protocol (IP), Multiprotocol Label Switching (MPLS).

The network can have an SDN controller and a logically centralised control plane. The network can have a distributed control plane, for example between IP routers, which is used by the SDN controller.

The control apparatus may be configured to perform any of the described or claimed methods.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIG. 2 shows a timeline of a non-time-aware path and a time-aware path;

FIG. 3A shows a method of path computation;

DETAILED DESCRIPTION

Figure 1:
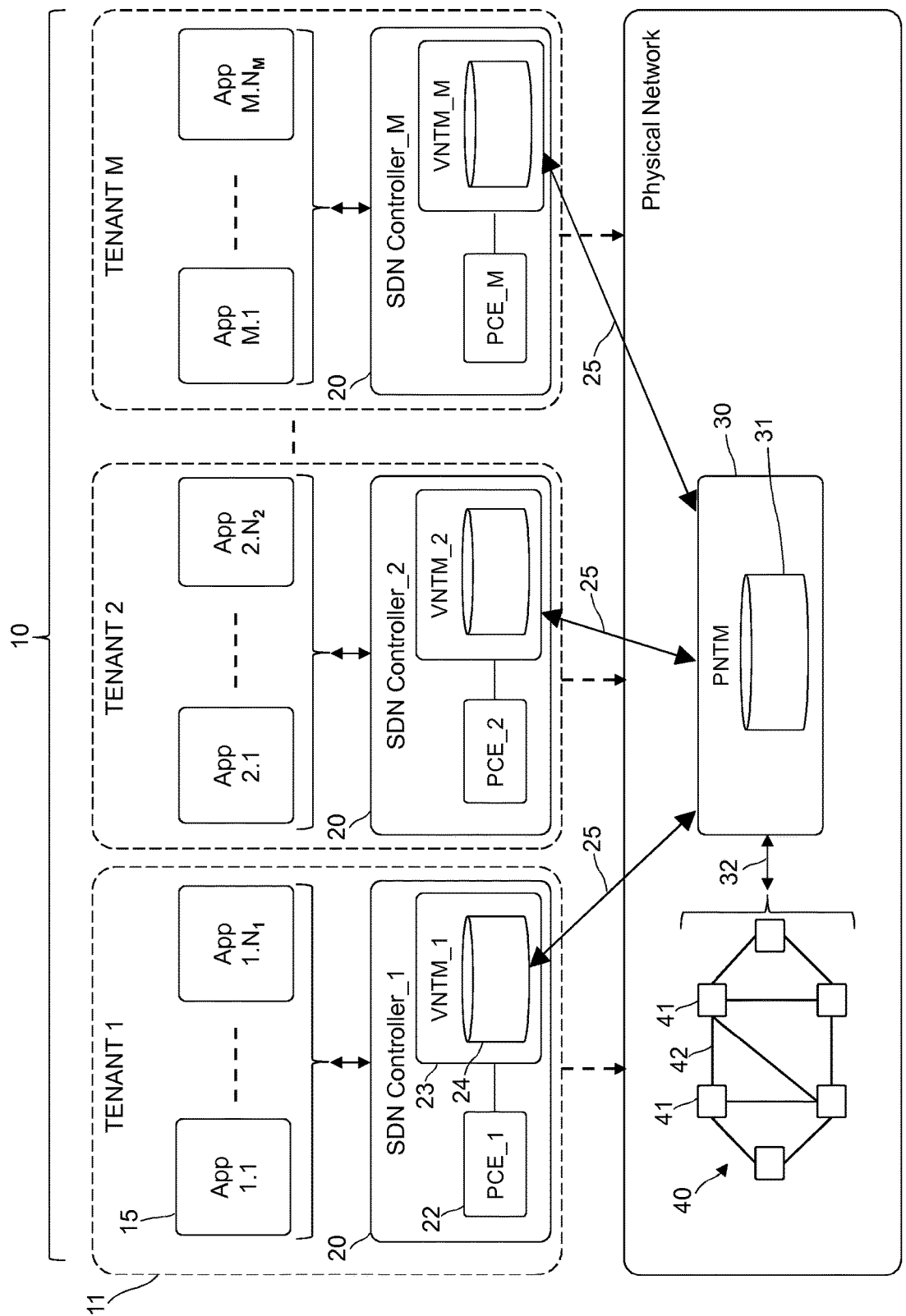
FIG. 1 shows a communications network with a plurality of tenants sharing a common physical network.

FIG. 1 shows an example of a communications network with a plurality 10 of tenants 11 sharing a common physical network 40. In this disclosure this type of network is called a multi-tenant network. The physical network 40 comprises a set of resources, such as nodes (also called network elements, NE) 41 and transmission links 42 connecting the nodes 41. In the example of an optical transmission network, traffic is carried on the transmission links 42 by frequency or wavelength channels. Paths are set up in the network by reserving wavelength channels, or time slots within a wavelength channel, of a lightpath established between a pair (or more) of the nodes. A lightpath can pass via intermediate nodes. Each node has network interfaces for optically transmitting traffic on wavelength channels and for optically receiving traffic on wavelength channels. The network 40 may comprise one or more other types of transmission technology, such as electrical or wireless.

The physical network 40 is shared among the plurality of tenants. In this example there are M tenants, where M is an integer number. Each tenant has an SDN controller 20. Each SDN Controller 20 serves a set of applications 15. The applications 15 can request network resources. Tenant 1 has a set of applications $1.1\text{-}1.N_1$. Each j-th SDN controller (where j=1 ... M) has a Path Computation Entity PCE_j and a virtual network topology manager VNTM_j. The VNTM_j maintains a topology of the network 40 which is available for use by that tenant. The VNTM_j has a data store (e.g. database) 24 of topology data. The VNTM_j has functional modules (e.g. software) to operate on the data store, such as a functional module to retrieve data from the data store and a functional module to update the data store. For the example of an MPLS-TE network, the data store of the VNTM_j can comprise a Traffic Engineering Database (TED). The data store of the VNTM_j can store a uniform representation of the network at different layers with node and links, and their parameters, such as bandwidth, reservable bandwidth, latency, administrative colours, priorities, Shared Risk Link Group (SRLG) and other data about the physical layer.

An example of a network with multiple tenants is a network owned by a large telecom provider, where the tenants are smaller telecom providers. Another example of a network with multiple tenants is a network where each tenant provides a particular service.

A physical network topology manager (PNTM) 30 is provided. The PNTM has knowledge of the overall physical network. The PNTM 30 has a data store 31 of topology data. The PNTM 30 can use a routing protocol 32 such as Border Gateway Protocol-Link State (BGP-LS) to acquire topology data from the physical network. The PNTM 30 may expose different physical resources to each j-th tenant. Accordingly, the PCE_j and SDN controller of a tenant only "sees" a topology which is available for use by that tenant. The topology exposed to a tenant is described in this disclosure as a virtual topology. The owner of the physical network 40 may partition the network between tenants in various ways. For example, a particular tenant may have access to a subset of the total nodes of the network, a subset of wavelengths on fibres, a subset of fibres, a subset of IP router ports or some other partition of the overall resources of the network. The resources available to one tenant may overlap at least partly with the resources available to another of the tenants. For example, one or more links and/or nodes of the network may be shared between at least two of the tenants. The allocation of resources to a tenant may change over a period of time. For example, the allocation of resources to a tenant on one day may differ to the allocation of resources to that tenant on a following day.

The SDN controllers 20 and PCEs 22 are independent of one another. That is, SDN Controller_1 and PCE_1 of tenant 1 do not communicate with SDN Controller 2 and PCE_2 of tenant 2, or the SDN Controller_j and PCE_j of any other tenant. Instead, the SDN Controller_1 and PCE_1 of tenant 1 communicate with the PNTM 30 to obtain current topology data. This allows the PCE of a tenant to compute a path independently of the PCEs of the other tenants. The SDN Controller 20 and PCE 23 of each tenant are capable of computing a path using the resources of the virtual topology exposed to it by the PNTM 30. This allows efficient path computation, because each tenant has a PCE 22 which is dedicated to that tenant. The PCE is dedicated to servicing path computation requests of that tenant and does not have to be shared with other tenants. This also has an advantage of not requiring tenants to exchange information with other tenants, which could compromise security. Communication between an SDN Controller 20 and PNTM 30 is described in more detail below.

The resources of the virtual topology can be an abstracted version of the actual resources of one or more layers of the physical network 40. For example, a virtual topology may indicate the presence of a link between a pair of nodes which is implemented, in the physical network, by a path between additional intermediate nodes not forming part of the abstracted topology. Another example of abstraction is a network where nodes are connected by tunnels in the optical domain and the abstraction removes certain details about the lightpaths. The abstracted view can record the level of resiliency due to, for example, node or link disjointness, but remove other details.

The network can be time-aware. This means that a path can be computed by a SDN Controller 20 for a future time interval. This concept is illustrated using the timeline of FIG. 2. Assume time t1 is the current time. Path (i) is a conventional, non-time-aware path. A PCE computes the path at time t1. The path can be created at time t1 (or shortly after t1) and can remain until such time as an operation is performed to delete the path. Path (ii) is a time-aware path. A PCE can compute, at time t1, a path which is to be used at a future time interval t2-t3. This requires the PCE to have knowledge of network resources at future time intervals. The path can be created at time t2, and remains until time t3. At time t3 the path is deleted.

The PCE 22 can provide two main services to PCCs. A first of these services is path computation. A PCC requests a new path and the PCE returns, if possible, an explicit route including all the selected path resources for that path. For a time-aware network, the path can be computed for a future time interval. Path computation is a "read-only" operation as it does not affect the network status maintained by the PCE. A second service is the ability to create a path, or to reserve resources for a path. The PCE can initiate creation of a path. Path creation can include the PCE 22 signalling to an ingress node of the new path. The PCE 22 can reserve path resources for the new path. The PCE 22 can also delete a path. The PCE 22 may also modify a path, such as increasing or reducing the bandwidth of a path. Typically, this will involve deleting an existing path and then creating a new path with the new parameters.

The PCE 22 can be implemented in a centralised form at a node of the network, or the functionality can be distributed among a plurality of nodes of the network or be virtualised to use a so-called computing cloud. Similarly, the VNTM 23 can be centralised or distributed. The PCE 22 can form part of the Network Management System (NMS).

FIG. 3A shows an overview of a first example of a method of computing a path in a network, such as the network of FIG. 1. The method can be performed by an SDN Controller 20 of a tenant. The method comprises, at block 101, receiving a request for computation of a path in the communications network. The request can be a PCEP PCEReq message. The request can be received from an application (e.g. one of the applications 15) of that tenant, or from another type of PCC. At block 102, the method obtains a current virtual topology of the communications network from a shared topology store 31 which is shared by the plurality of tenants. The shared topology store 31 is maintained by the PNTM 30. The virtual topology obtained from the PNTM is a topology of the communications network which is available for use by that tenant. At block 106, the method uses the virtual topology to service the request. For example, if the request is a request for a path between two nodes of the network, the method computes 107 a path between those nodes using the virtual topology. The request may specify one or more path constraints (e.g. path cost, path length, bandwidth) and the method may compute a path which meets the path constraints.

In this network, the PCE 22 of one tenant does not need to communicate with a PCE 22 of another tenant. This requires that each PCE 22 uses current virtual topology data when computing a path, or creating a path.

There are various ways in which the SDN Controller 20 can obtain a current virtual topology. One possible option is for the SDN Controller 20 to obtain a complete current topology from the shared topology store 30. Another possible option (block 104) is for the SDN Controller 20 to obtain a current virtual topology by requesting an update from the PNTM 30. The update is data which specifies differences between the current topology held by the SDN Controller 20 and the latest topology held by the PNTM 30. This is a pull mechanism, because the SDN Controller requests the data from the PNTM 30. Another possible option (block 105) is for the SDN Controller 20 to obtain a current virtual topology by receiving an update from the PNTM 30. The update is data which specifies differences between the current topology held by the SDN Controller 20 and the latest topology held by the PNTM 30. This is a push mechanism, because the SDN Controller receives the data without needing to request it. For options 104 and 105, the SDN Controller 20 holds a current topology after applying the update it receives from the PNTM 30. Options 104 and 105 can be more advantageous than option 103 as they will typically require a much smaller data transfer between the PNTM 30 and the SDN Controller 20. Whichever option (103, 104, 105) is used, the virtual topology data held by the SDN Controller 20 is synchronised with the PNTM 30. Block 102 can be performed in response to receiving the request for computation of a path. Alternatively, block 102 can be performed some time before receiving the request for computation of a path. Communication of topology data between the PNTM 30 and VNTM_j 23 can be carried in any suitable form, such as JavaScript Object Notation or Extensible Markup Language (XML).

Figure 3B:
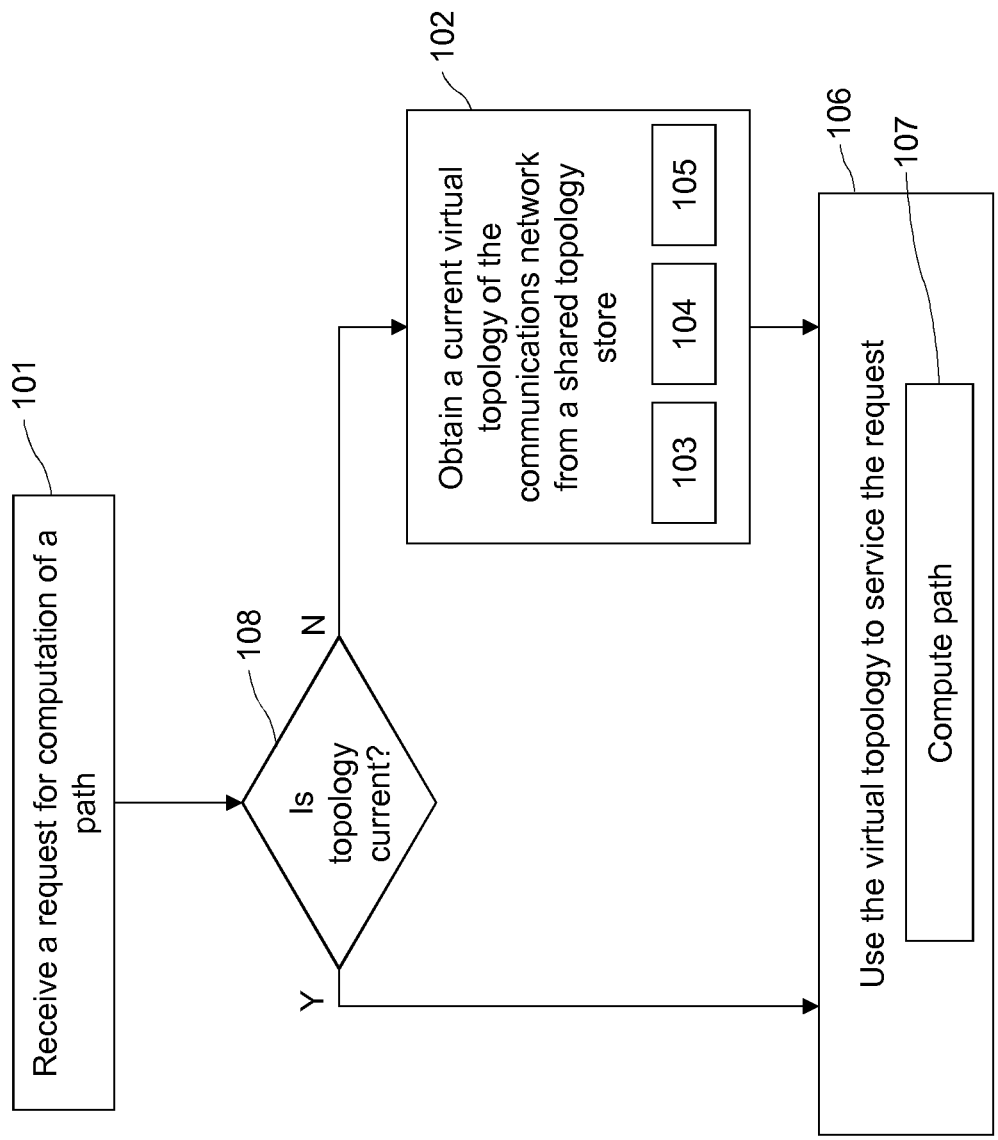
FIG. 3B shows another method of path computation.

FIG. 3B shows an overview of a second example of a method of computing a path in a network. The method of FIG. 3B is similar to FIG. 3A, and corresponding blocks have the same labels. The method of FIG. 3B differs in that, after receiving the request for path computation at block 101, the method determines at block 108 if the locally stored virtual topology data is current. For example, block 108 may determine how much time has passed since the virtual topology data held by the VNTM was last updated. In another example, the virtual topology can be considered current if the PNTM has been instructed to notify topology changes to the VNTM and the VNTM has not received a message from the PNTM indicating that a change has occurred. If the virtual topology is determined to be current, the method proceeds to block 106. If the virtual topology is determined to not be current, the method proceeds to block 102 and obtains a current virtual topology of the network from PNTM 30, such as by using one of the options 103-105 shown in FIG. 3A, and described above. The term "locally stored" means the virtual topology data stored by the tenant, in contrast to the topology data shared by the plurality of tenants. The virtual topology data may be stored at a store 21 located at the SDN Controller 20, or at a physical location which is separate from the SDN Controller 20.

The updates and comparisons of a virtual network topology can be based on a message digest mechanism including spatial (and, optionally, temporal information). The use of a digest can have an advantage of reducing the amount of data requiring transfer between the PNTM 30 and VNTM 23 and can allow a faster comparison of a large amount of data. The digest can be a string obtained from file data by means of an algorithm. The string may be of fixed size. The digest has the property that it is unique whatever the file and is sensitive to changes in the data within the file. That is, the value of the digest of a file changes whenever a change is made to the data within the file. The digest can be used as an alias for tagging and comparing large data files. For example, two large files can each have a respective digest of 32 hexadecimal characters in length. By comparing the two digests, it is possible to determine if files are identical (i.e. the topologies they represent is identical) or if the files are different (i.e. the topology represented by one file has been updated compared to the topology represented by the other file). Block 102 shown in FIGS. 3A and 3B can use a digest mechanism. For example, in option 103 the VNTM 23 can send a digest value to the PNTM 30. If the digest value sent to the PNTM is equal to a digest value of the data file held for that tenant, then the PNTM can quickly determine that no update is required, and the PNTM does not send topology data to the VNTM 23. Similarly, in option 104, the VNTM 23 can send a digest value to the PNTM 30. If the digest value sent to the PNTM is equal to a digest value of the data file held for that tenant, then the PNTM can quickly determine that no update is required, and the PNTM does not send topology data to the VNTM 23.

As noted above, the topology data can be time-aware. That is, the topology data specifies availability of resources at different times over a future period of time rather than just for the present time. The request for computation of a path, received at block 102, can specify a time interval for which the path is required. For example, using the example of FIG. 2 again, if it is assumed that the request is received at time t1, the request may be in respect of a future time interval t2-t3 shown in FIG. 2. The method computes a path based on resources which are indicated as available during the requested time interval.

There are various mechanisms for updating the topology data held by the VNTM with the updates received at 104 or 105. Update algorithms such as a "three-way merge" can be used. Such algorithms are used in software revision control.

Figure 4:
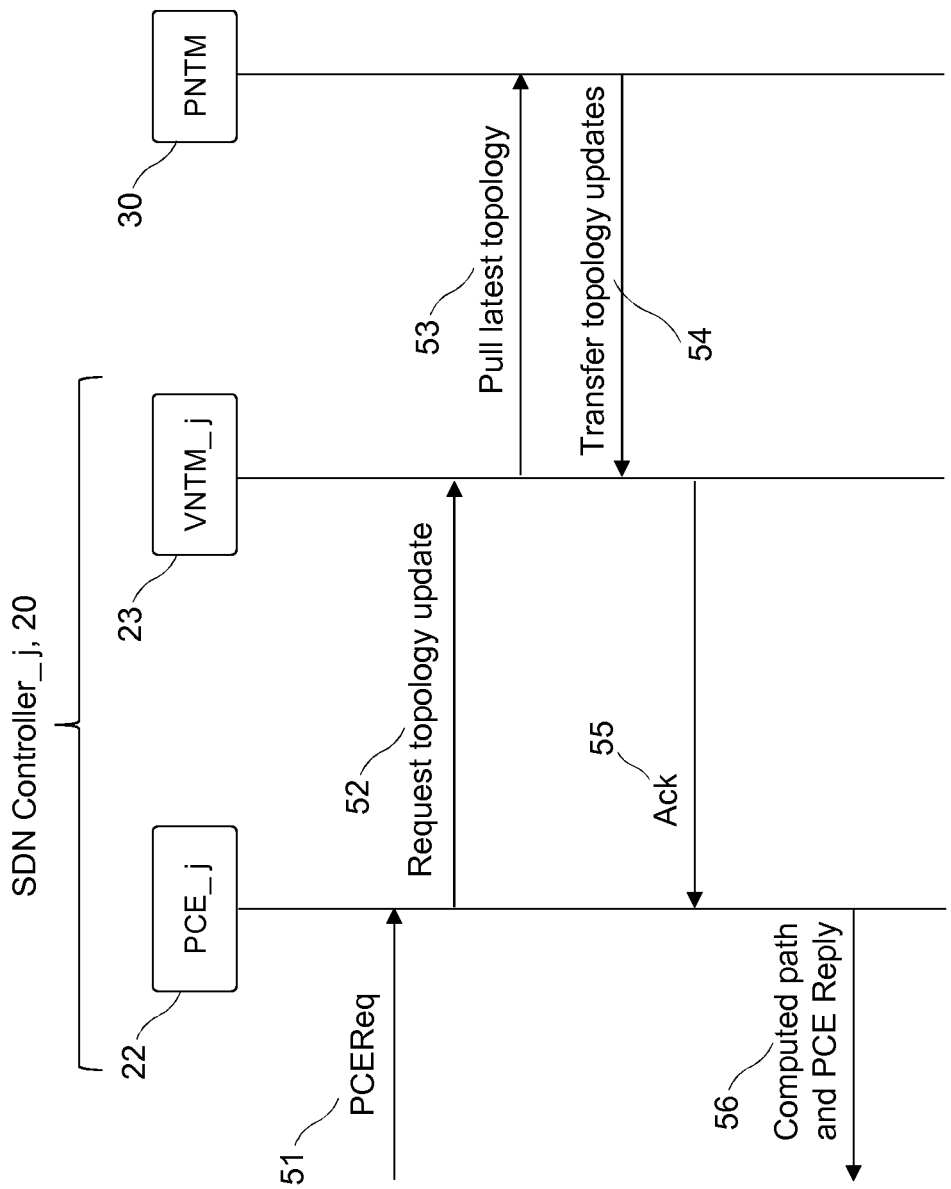
FIG. 4 shows an example of signalling between network entities to perform the path computation method of FIG. 3.

FIG. 4 shows an implementation example of the method of FIG. 3A or 3B. The entities involved in the communication are the PCE 22 and the VNTM 23 of a tenant, and the PNTM 30. PCE_j 22 receives a PCEReq message 51 which requests computation of a path. A hook 52-55 is introduced. Firstly, the PCE_j 22 asks the VNTM_j to update itself. The VNTM_j 23 pulls 53 the latest topology from PNTM 30. The update(s) are transferred 54 from the PNTM 30 to the VNTM_j 23. VNTM_j 23 sends the PCE_j 22 an acknowledgement 55 when it has updated the topology. The PCEj 22 then performs the path computation using the latest topology information and returns the result to the requesting PCC using a conventional PCE Reply message 56.

Figure 5A:
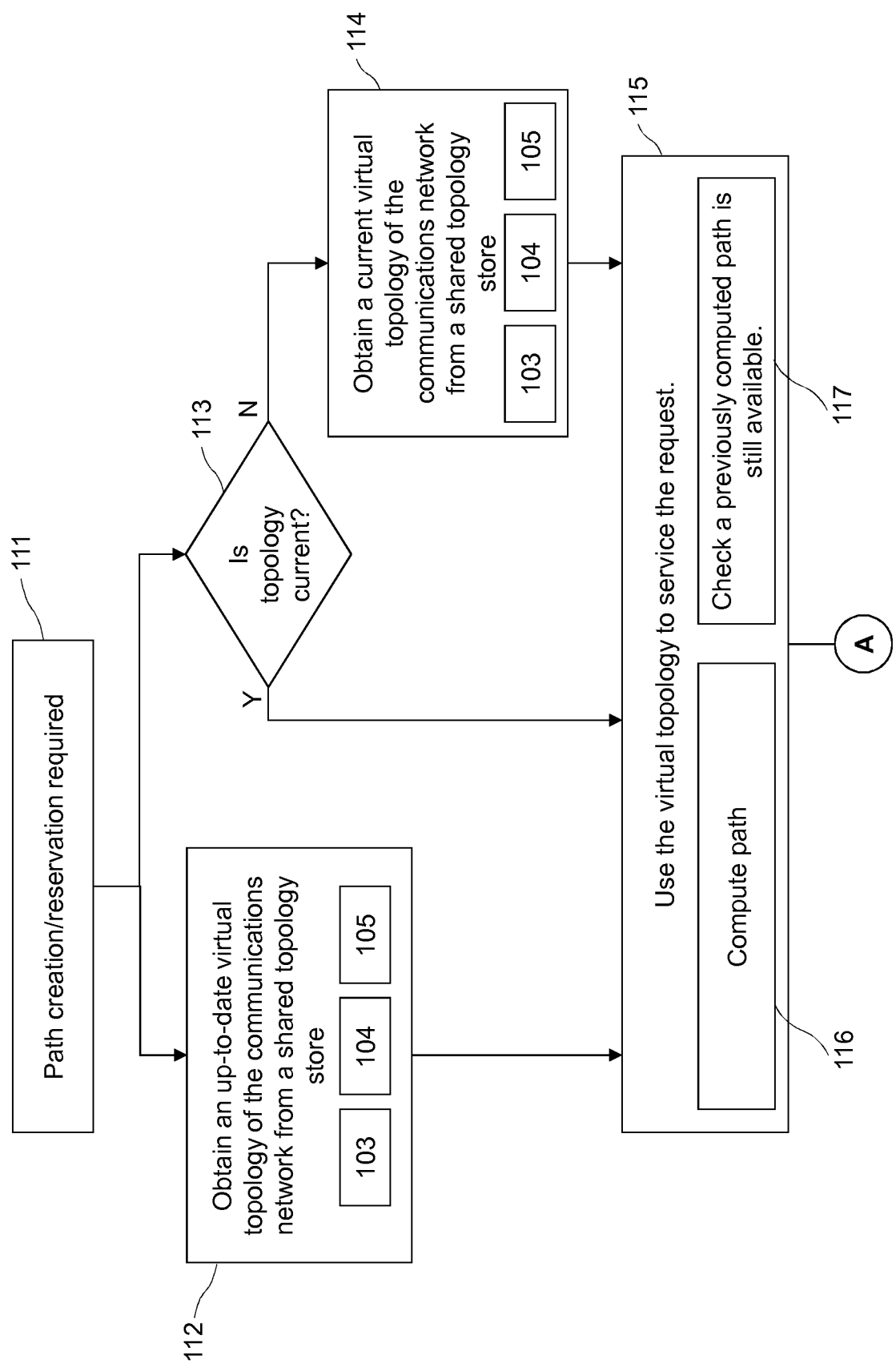
FIGS. 5A and 5B show a method of path creation.
Figure 5B:
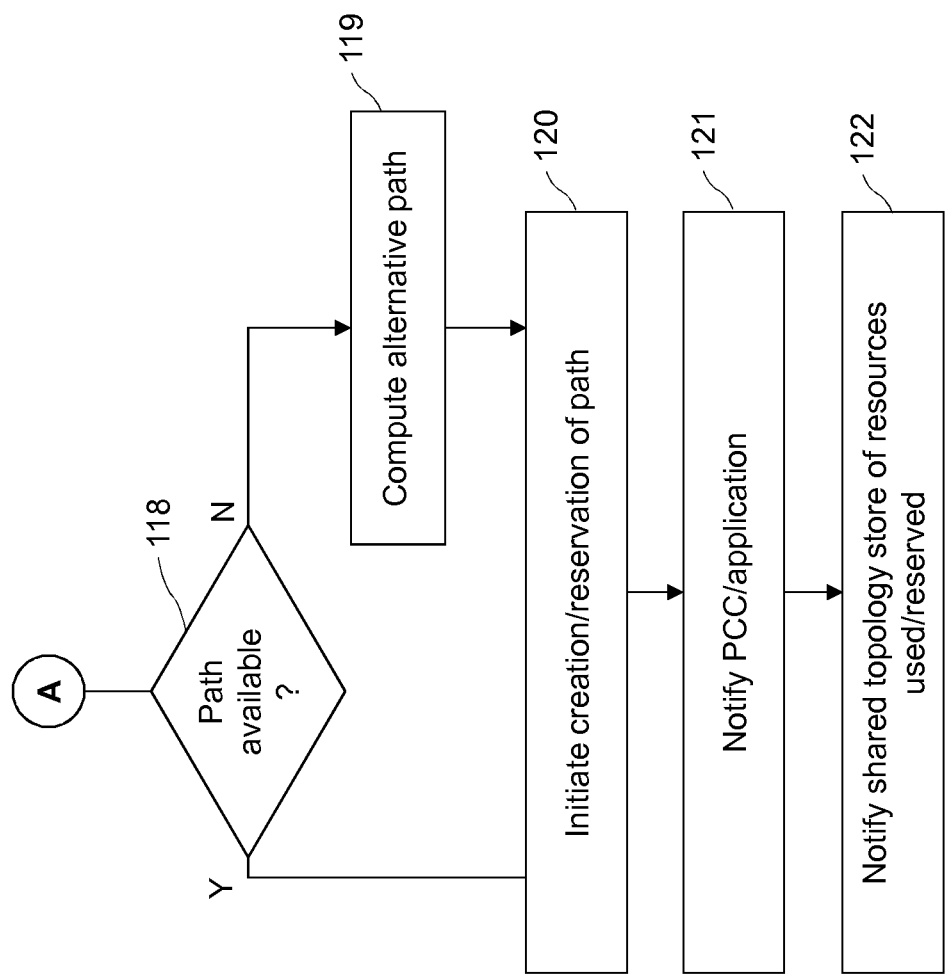

FIGS. 5A and 5B show a first example of a method to create a path in a network or to reserve resources for a path in a network, such as the network of FIG. 1. The method can be performed by an SDN Controller 20 of a tenant. The method of FIGS. 5A and 5B may be performed after performing the method of FIG. 3A or 3B. That is, a PCC may first request path computation (FIG. 3A, 3B) and then, subsequently, the PCE may create the computed path (FIGS. 5A, 5B). Alternatively, the method of FIGS. 5A and 5B may be performed without first performing the method of FIG. 3A or 3B.

The method comprises, at block 111, determining that a path creation or reservation is required. The method may proceed directly to block 112 and obtain a current virtual topology of the network from the shared topology store (e.g. PNTM 30) whenever a request 111 is received. Any of the options 103-105 shown in FIGS. 3A, 3B, and described above, can be used to obtain a current virtual topology. Alternatively, the method may first determine, at block 113, if the current virtual topology is current. For example, block 113 may determine how much time has passed since the virtual topology was last updated. In another example, the current virtual topology can be considered current if the PNTM has been instructed to notify topology changes to the VNTM and the VNTM has not received a message from the PNTM indicating that a change has occurred.

If the locally stored virtual topology is determined to be current, the method proceeds to block 115. If the current virtual topology is determined to not be current, the method proceeds to block 114 and obtains a current virtual topology of the network from PNTM 30, such as by using one of the options 103-105 shown in FIG. 3A, and described above.

The method then proceeds to block 115. At block 115, the method uses the locally stored virtual topology to service the request. Block 115 may use the virtual topology to check 117 if the previously computed path is still available. Additionally, or alternatively, block 115 may use the virtual topology to compute a path 116. Computation of a path is the same as described above for FIGS. 3A and 3B. If a suitable path is computed, or if the path previously computed is still available then the "yes" branch at block 118 is followed to block 120. If the path is not still available then the "no" branch at block 118 is followed to block 119. The method computes an alternative path.

Block 120 initiates creation/reservation of the path. This can involve signalling details of the path (e.g. the ERO) to the ingress node of the path. Block 121 notifies the PCC of a successful or unsuccessful path creation. Block 122 notifies the PNTM 30 of the resources used/reserved by the new path so that the PNTM can update its topology data. This allows the PNTM to notify other tenants of resources used by this tenant.

Figure 6A:
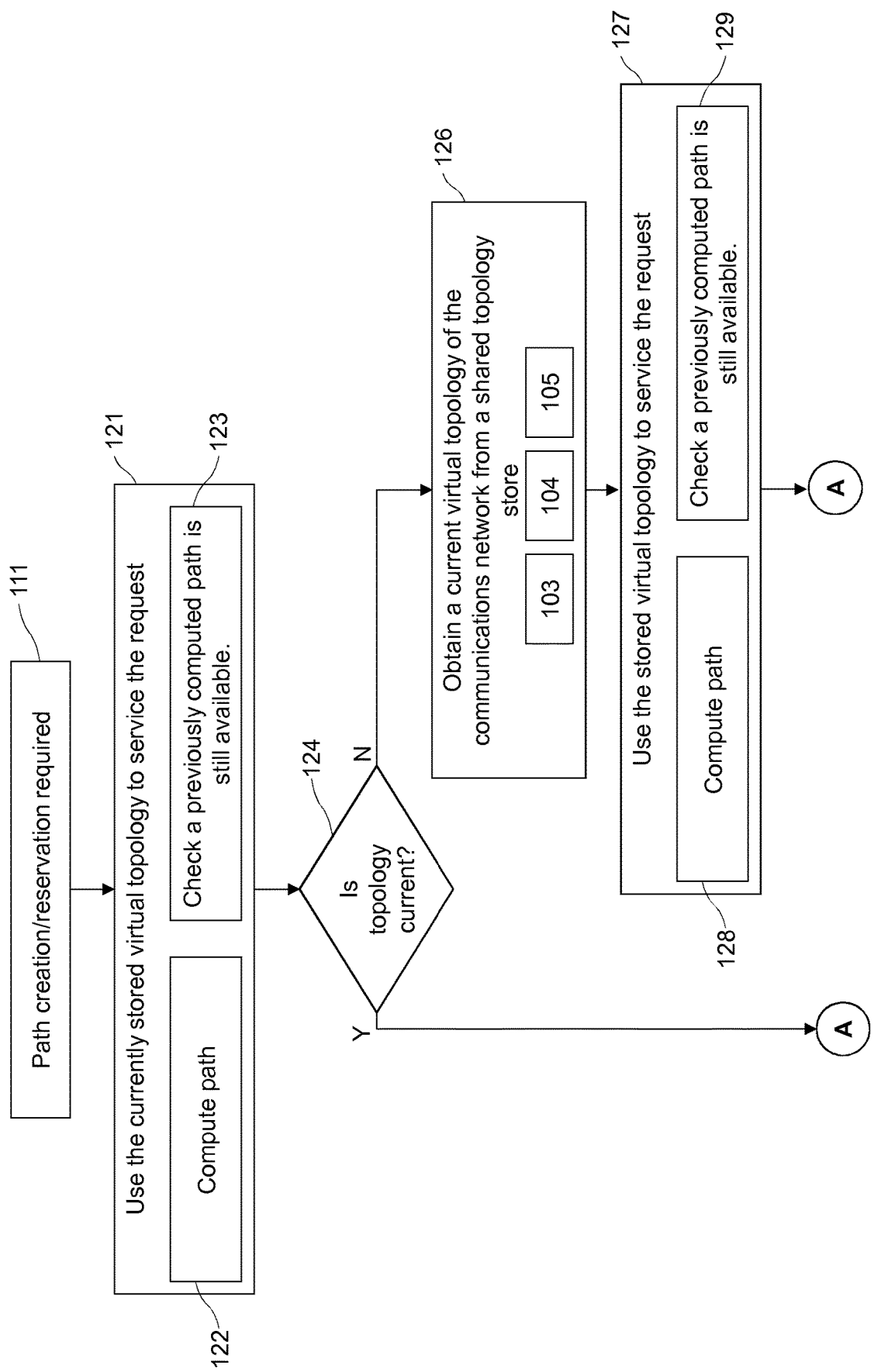
FIGS. 6A and 6B show another method of path creation.
Figure 6B:
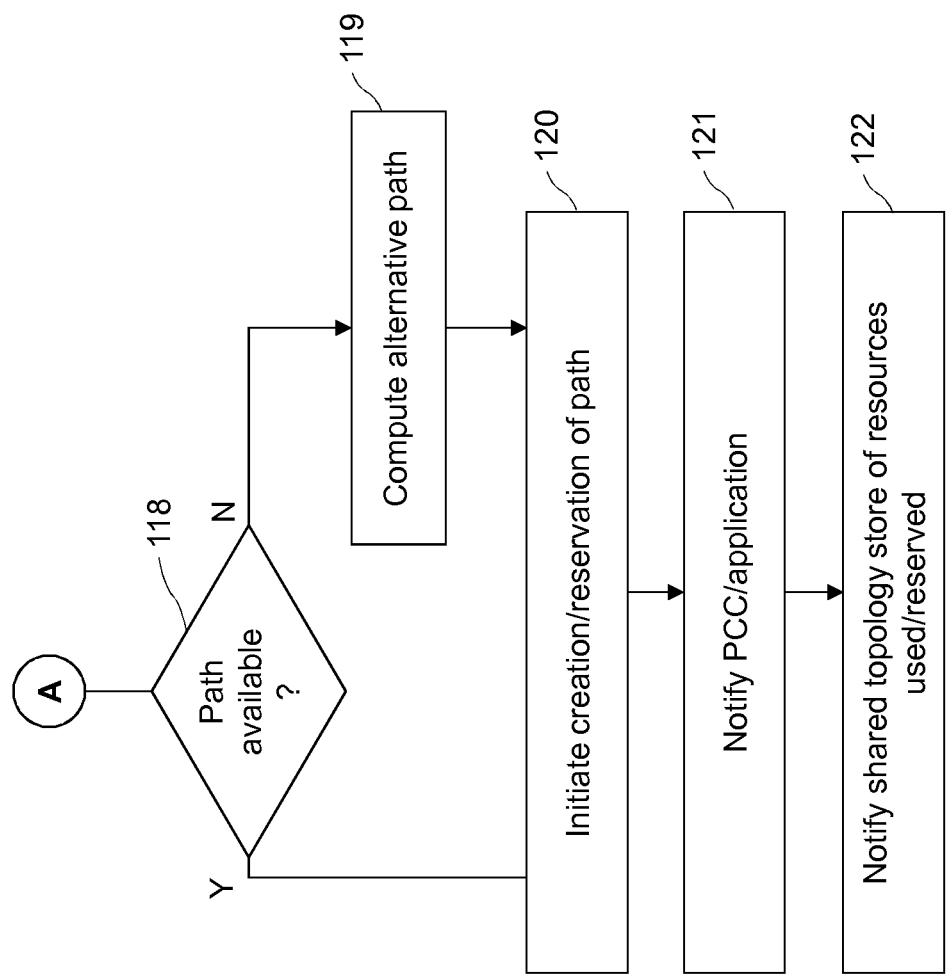

FIGS. 6A and 6B show a second example of a method to create a path in a network or to reserve resources for a path in a network, such as the network of FIG. 1. The method can be performed by an SDN Controller 20 of a tenant. The method of FIGS. 6A and 6B is similar to the method of FIGS. 5A and 5B, and corresponding blocks have the same labels. The method of FIGS. 6A and 6B differs in that it first uses the locally stored virtual topology to service the request and then checks if the locally stored virtual topology data is current (up-to-date). The method comprises, at block 111, determining that a path creation or reservation is required. At block 121 the method uses the locally stored virtual topology to service the request. Block 121 may use the virtual topology to check 123 if a previously computed path (e.g. a path computed using the method of FIG. 3A or 3B) is still available. Additionally, or alternatively, block 115 may use the virtual topology to compute a path 122. Computation of a path is the same as described above for FIGS. 3A and 3B.

The method then proceeds to block 124 and checks if the locally stored virtual topology data is current. For example, block 113 may determine how much time has passed since the virtual topology was last updated. In another example, the current virtual topology can be considered current if the PNTM has been instructed to notify topology changes to the VNTM and the VNTM has not received a message from the PNTM indicating that a change has occurred. If the stored virtual topology data is determined to be current, the method proceeds to block 118. If the locally stored virtual topology data is determined to not be current, the method proceeds to block 126 and obtains a current virtual topology of the network from PNTM 30, such as by using one of the options 103-105 shown in FIG. 3A, and described above. Because the topology used at block 121 was not current, the method proceeds to block 127 and uses the new virtual topology data to service the request. As before, block 127 may use the virtual topology to check 129 if a previously computed path (e.g. a path computed using the method of FIG. 3A or 3B, or block 122) is still available. Additionally, or alternatively, block 127 may use the virtual topology to compute a path 128. The method then proceeds to block 118 of FIG. 6B. FIG. 6B is the same as described above for FIG. 5B.

Figure 7:
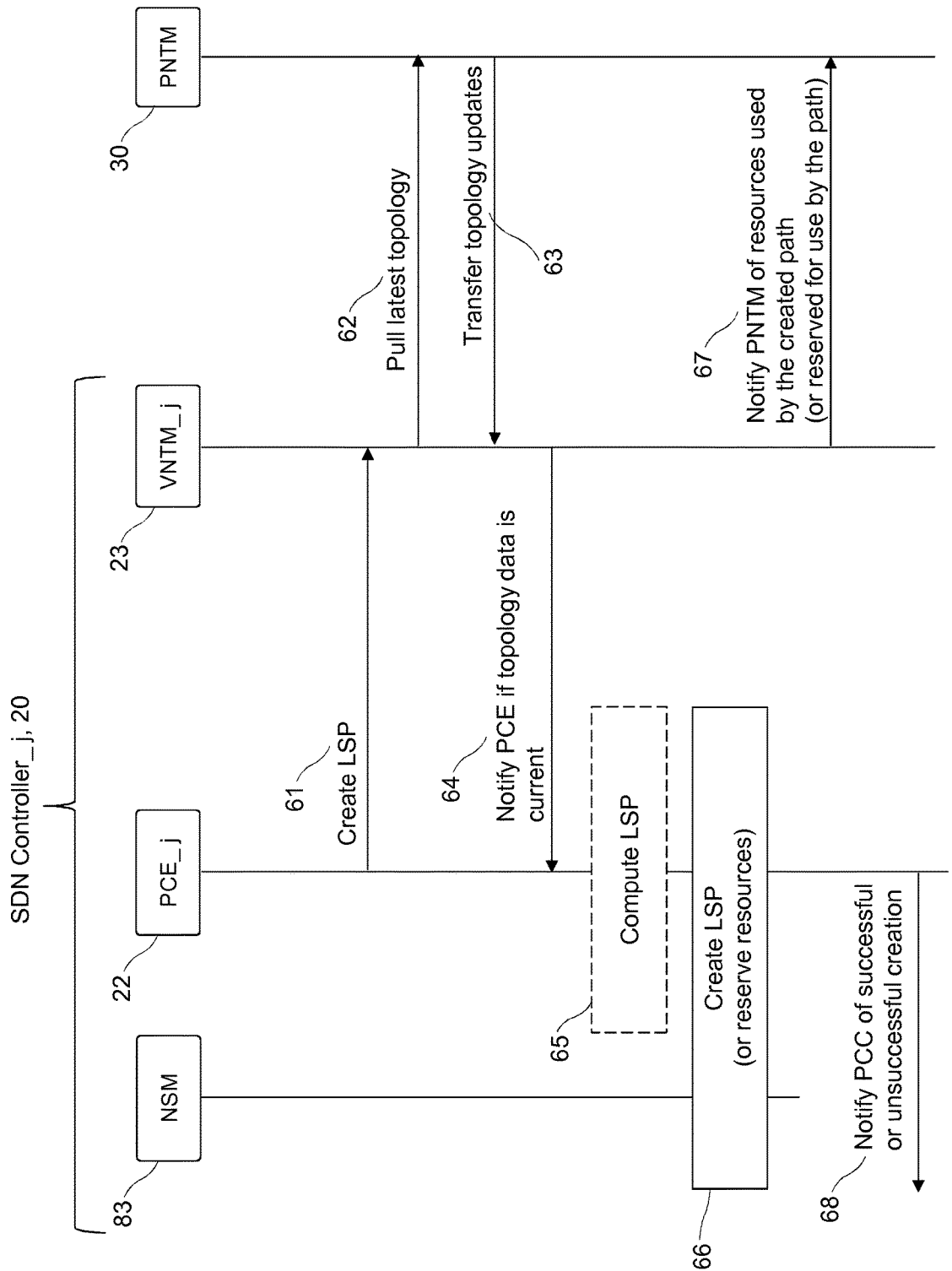
FIG. 7 shows an example of signalling between network entities to perform the path creation method of FIG. 5.

FIG. 7 shows an implementation example of the method of FIGS. 5A, 5B and FIGS. 6A, 6B. The entities involved in the communication are the PCE 22 and the VNTM 23 of a tenant, and the PNTM 30. A Network Service Manager (NSM) 83 may also be involved in path creation. PCE_j 22 sends a Create LSP message 61 to VNTM_j 23. The Create LSP message 61 may specify details of the path to be created, such as nodes and resources to be used. A hook 62, 63 is introduced. The VNTM_j checks that the topology data it stores is current. Firstly, the VNTM_j 23 pulls 62 the latest topology from the PNTM 30. Topology data is transferred 63 from the PNTM 30 to the VNTM_j 23, if updated data is needed. The VNTM_j 23 notifies 64 the PCE_j 22. The notification 64 notifies the PCE_j 22 that the topology data is current. The PCE_j 22 may compute a path at block 65. The SDN Controller 20 may create the path at block 66, or reserve resources for a future time. The path creation may involve the PCE_j 22 or a combination of the PCE_j 22 and the NSM 83. The PNTM is notified 67 of resources used (or reserved) by the path creation. The VNTM_j 23 may send this notification 67 to the PNTM 30. The PCE_j 22 notifies 68 the PCC (e.g. application) of the outcome of the path creation.

A PCC/application 15 may delegate the PCE to control a path. The method of FIG. 6 may be performed as part of this delegation of control. An active stateful PCE is described in IETF draft "PCEP Extensions for Stateful PCE" available at https://tools.ietf.org/html/draft-ietf-pce-stateful-pce-11. PCEP Extensions for PCE-initiated LSP Setup in a Stateful PCE Model are described in IETF draft "draft-ietf-pce-pce-initiated-lsp-04".

There are several possible ways in which the method of FIGS. 5A, 5B and 6A, 6B can be used with time-aware paths. The implementation depends on: (i) time-aware capabilities of the nodes of the network, and (ii) time-aware capabilities of the PCCs/applications requesting paths.

Firstly, consider capabilities of the nodes in the network. A node can be considered either as: (i) a time-aware capable node or (ii) a non-time-aware capable node. A non-time-aware capable node can be called a legacy node, as older nodes do not have time-aware capabilities. A time-aware capable node has the capability to create a requested path at a requested future time and can implement the path at the requested time. A non-time-aware/legacy node does not have this capability. Consider again the example of FIG. 2 where a path is requested in respect of a future time interval t2-t3. At time t1 (or at some point between t1 and before t2) the path is "created" at block 120. For example, the PCE initiates creation of the path by communicating with the ingress node of the path, and sending the ERO of the path. Time-aware capable nodes can store the request and can implement the path at the requested time.

If the nodes of the requested path are non-time-aware capable/legacy nodes, the method can operate in a different way. In some examples, an entity in the network may have the capability to reserve resources in respect of the future time interval t2-t3. This can prevent other PCCs or tenants from using those resources. The method can create the path (block 120) at, or shortly before, the time at which the path is required. In this example, the PCE can initiate creation of the path by communicating with the ingress node of the path and sending the ERO of the path at, or shortly before, time t2. If the network does not have the capability to reserve resources in respect of the future time interval t2-t3 then the method can create the path (block 120) at, or shortly before, the time at which the path is required. This operation may fail if the resources required by the path have been used by another application or tenant. If the path cannot be created, the method can attempt to compute, and create, an alternative path between the required nodes.

If a signalling mechanism such as Resource Reservation Protocol (RSVP) is supported, then it may only be necessary for the ingress node to be time-aware capable. The path computed by the PCE is signalled to the ingress node. The ingress node then sets up the path at the required time.

Secondly, consider capabilities of the PCCs/applications. In some examples, a PCC/application 15 may not have the capability to store a future path. The PCC/application 15 can delegate the PCE to create the path. In some examples, the PCC/application 15 may have the capability to create a path at a future time. In that case, the PCE may reserve resources for the path for a future time interval. The PCC/application 15 may then create the path at the required time.

Figure 8:
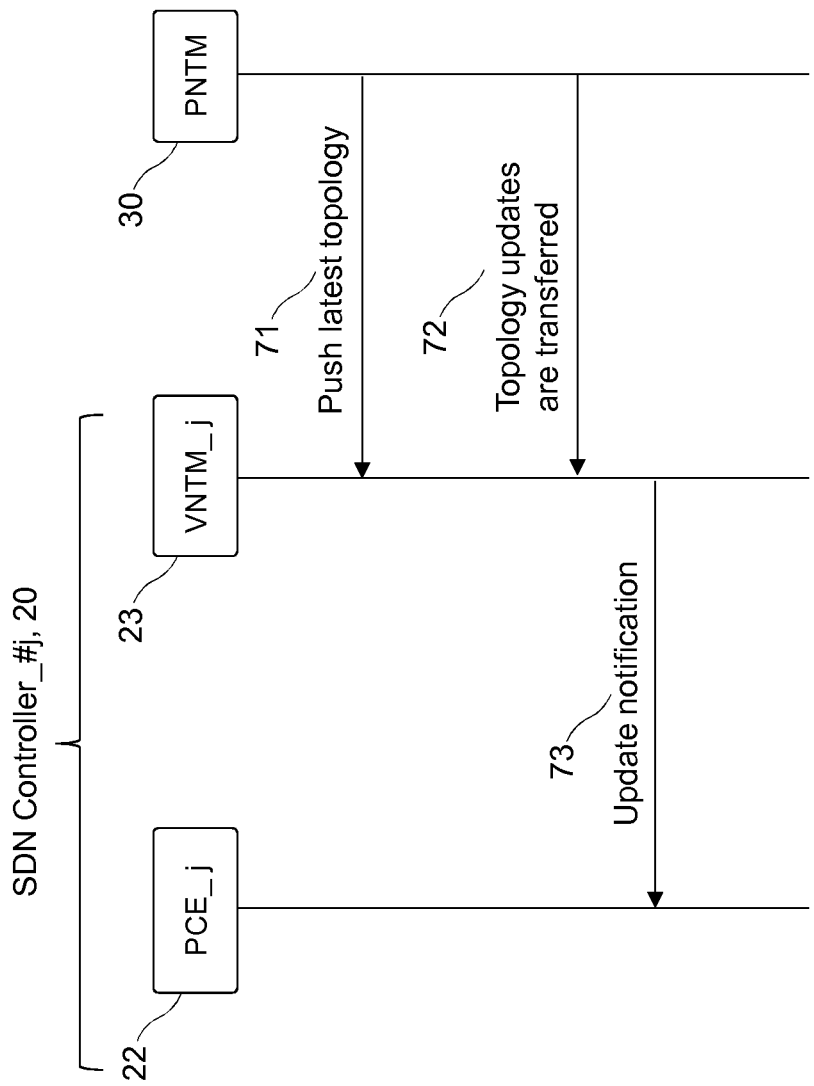
FIG. 8 shows an example of signalling between network entities to update the topology at a tenant.

FIG. 8 shows an implementation example of transferring topology updates from the PNTM 30 to the VNTM 23. This corresponds to option 105 of FIGS. 3A, 3B. The PNTM 30 signals 71 that it is to send a topology update and then sends the topology update 72. The VNTM_j sends a notification 73 to the PCE_j that an update has occurred.

The topology updates can be advantageously exchanged in form of differences with respect to the previous state and with the associated digest.

The time period between the PNTM pushing updates to VNTMs can be fixed, or can vary. The PNTM can be configured to push updates after a change, or a threshold number of changes, have been made to the virtual topology of a particular tenant. This can reduce the amount of data communicated between the PNTM and VNTMs.

The PNTM pushes changes to a VNTM_j of a tenant which affect the virtual topology of that tenant. For example, consider that the virtual topologies of two tenants are different, apart from one shared transmission link between a pair of nodes C-D. The PNTM pushes changes to the link C-D to both tenants, because this affects the virtual topologies of both tenants. Other changes are only pushed to the tenant which includes that node/link in their virtual topology.

Figure 9:
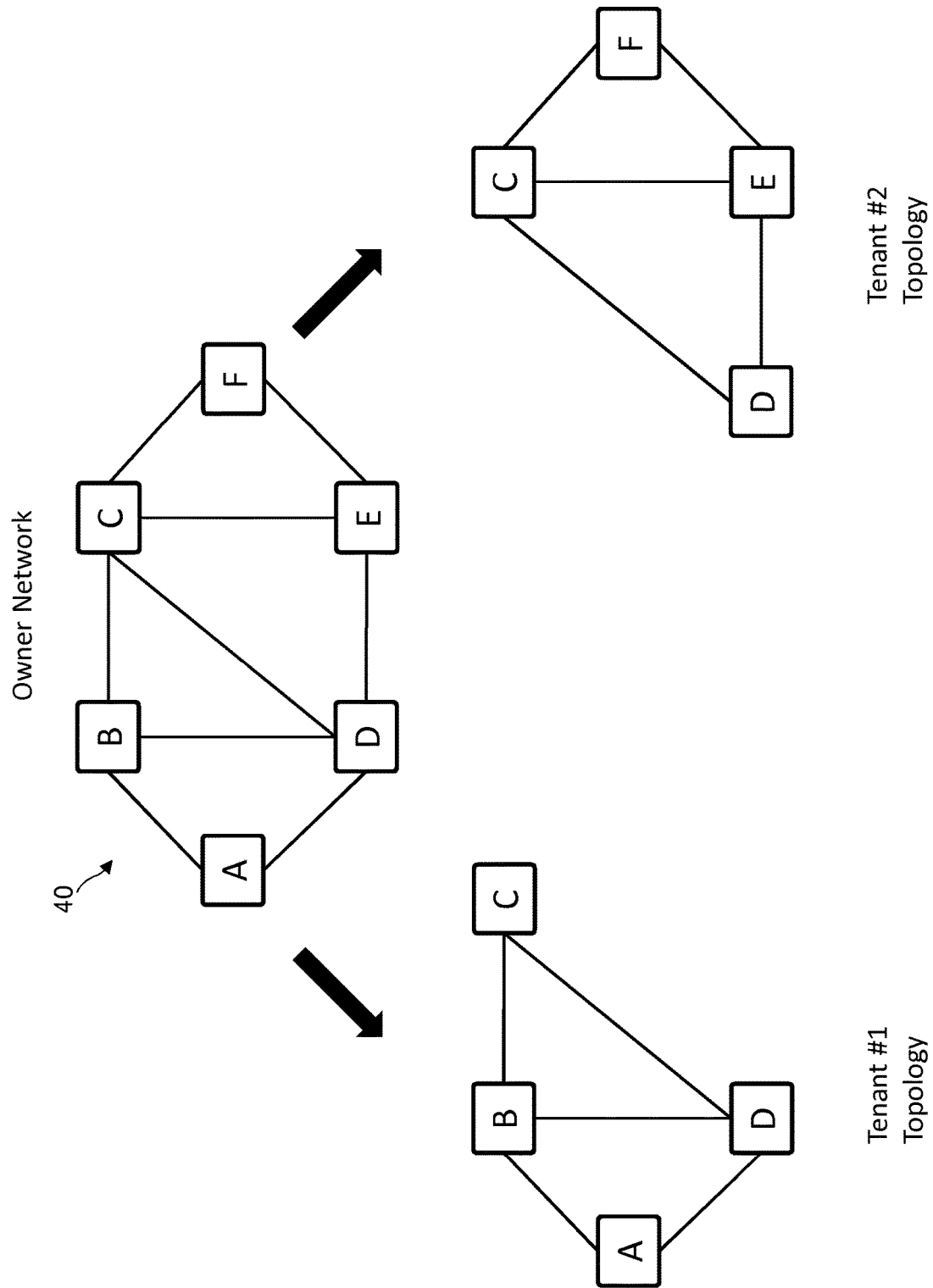
FIG. 9 shows an example network topology and virtual topologies of tenants.
Figure 10A:
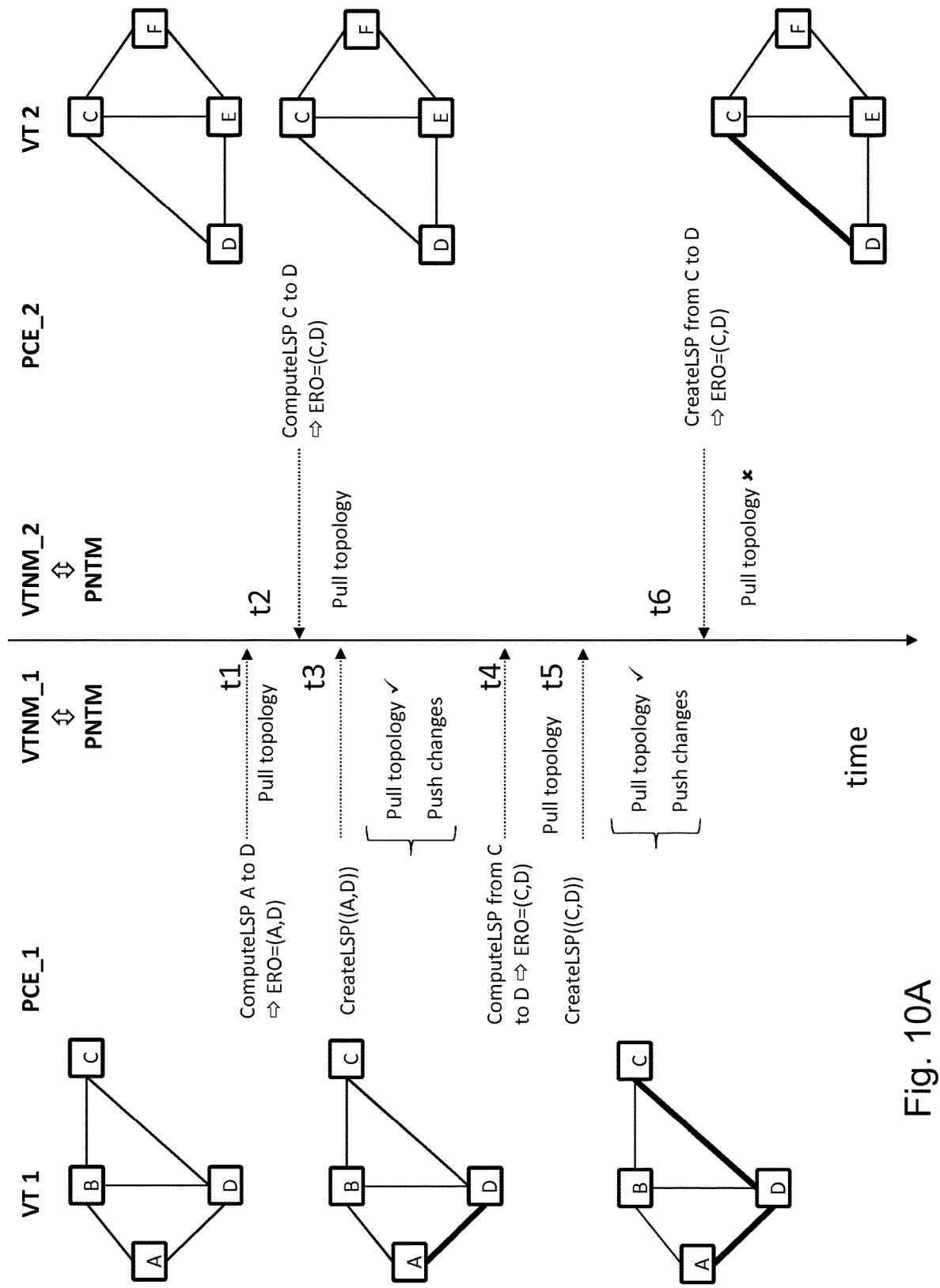
FIGS. 10A and 10B show a timeline of using the network of FIG. 9.
Figure 10B:
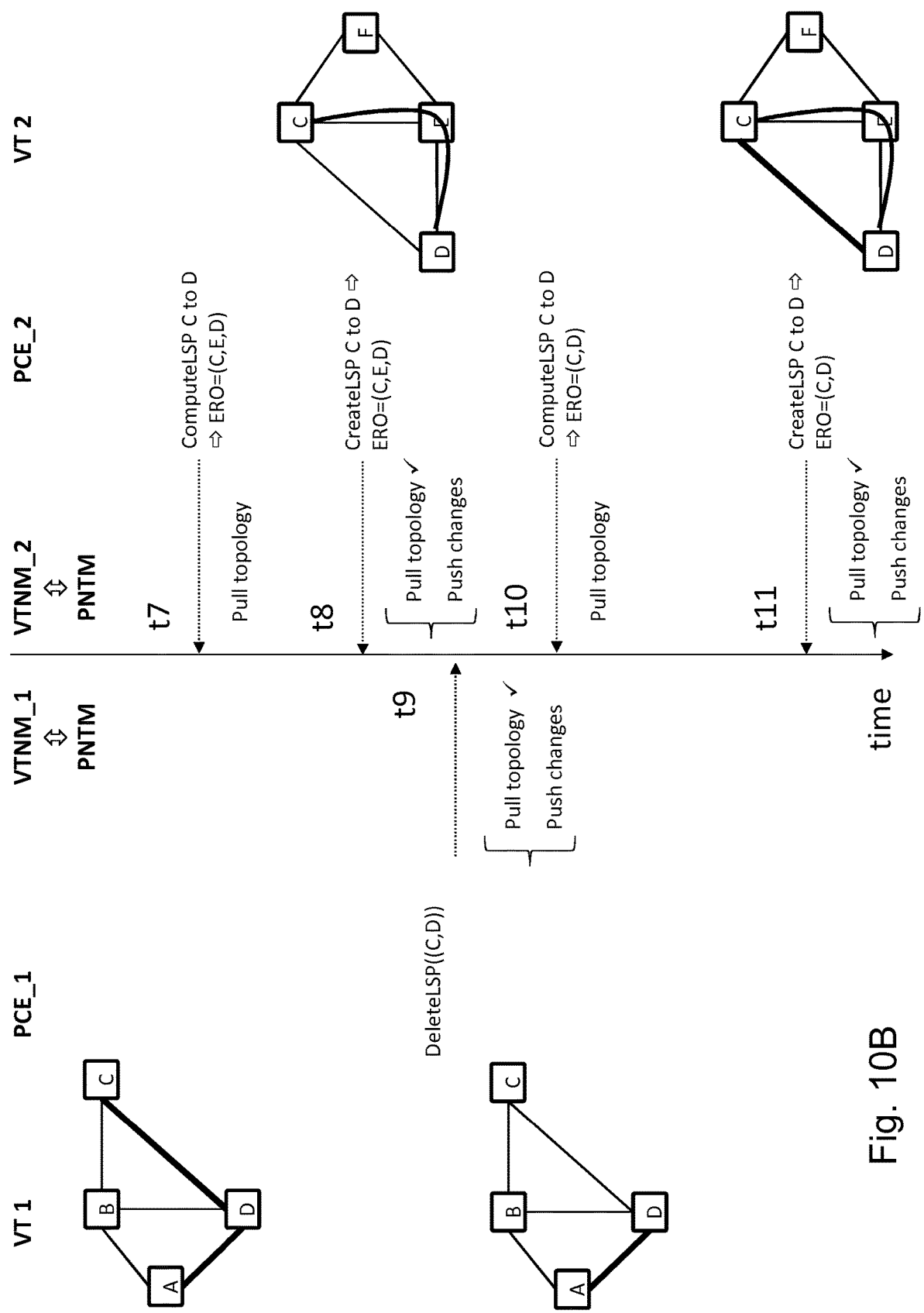

FIG. 9 and FIGS. 10A, 10B show a worked example using an example network topology. The example physical network 40 comprises six nodes A to F. The nodes A to F are connected by links as shown. In this example, the PNTM 30 exposes to Tenant 1 a virtual topology (VT) comprising nodes A, B, C and D. The PNTM 30 exposes to Tenant 2 a virtual topology comprising nodes C, D, E and F. Some resources of the network 40 are shared between tenant 1 and tenant 2. In this example, a link between nodes C and D is shared between the virtual topologies of tenant 1 and tenant 2. For simplicity, this example partitions the physical network on a node/link basis but the partitioning could be made on the basis of wavelengths in a WDM network, timeslots or some other basis.

FIGS. 10A and 10B show a timeline of operations in the network. The left-hand side of the figures shows operations relating to tenant 1 and the right-hand side of the figures shows operations relating to tenant 2. Before t1 there are no paths in the network 40.

At time t1 PCE_1 is requested to calculate a path from A to D. VNTM_1 pulls from the PNTM the latest topology. PCE_1 calculates the path (A, D) as an Explicit Routing Object (ERO).

At time t2 PCE_2 is requested to calculate a path from C to D. VNTM_2 pulls from the PNTM the latest topology. PCE1 calculates (C, D) as the ERO.

At time t3 PCE_1 actually creates the path from A to D using the calculated ERO. VNTM_1 first pulls from the PNTM the latest topology and the result is OK. That is, the path computed at t1 (A, D) is still available, and does not conflict with any other resources allocated by tenant 2. PCE_1 creates the LSP into VTNM_1. The resources used by the path are pushed to the PNTM 30. The shared link C-D is still available.

At time t4 PCE_1 is requested to calculate a path from C to D. VNTM_1 pulls from the PNTM the latest topology. C-D is still available. Although PCE_2 of tenant 2 has computed a path using C-D, tenant 2 has not created a path using C-D or reserved the resources of path C-D.

At time t5 PCE_1 create the path from C to D. VNTM_1 first pulls from the PNTM the latest topology and the result is OK (no conflicts).

At time t6 PCE_2 attempts to create the path from C to D. VNTM_2 first pulls from the PNTM the latest topology. The latest topology indicates that C-D is no longer available. If the unsolicited notification ("push") mechanism (block 105, FIG. 3, FIG. 7) is used, then VNTM_2 and PCE_2 will already know about the conflict shortly after it occurs at t5. PCE_2 cannot create the path with the desired ERO.

At time t7 PCE_2 calculates an alternative path from C to D. The path has the routing C-E-D. The ERO is now (C, E, D).

At time t8 PCE_2 successfully creates the path with ERO (C, E, D) and VNTM_2 pushes changes to the PNTM 30.

At time t9 PCE_1 deletes the LSP with ERO (C, D) from VNTM_1 and the change is then pushed to the PNTM 30.

At time t10 PCE_2 is requested to calculate a path from C to D. VNTM_2 pulls from the PNTM the latest topology. The link C-D is now available and this change is applied to VNTM_2.

At time t11 PCE_2 creates the path from C to D. VNTM_2 pulls from the PNTM the latest topology and, after successful operation, pushes the updates back to the PNTM 30.

Figure 11:
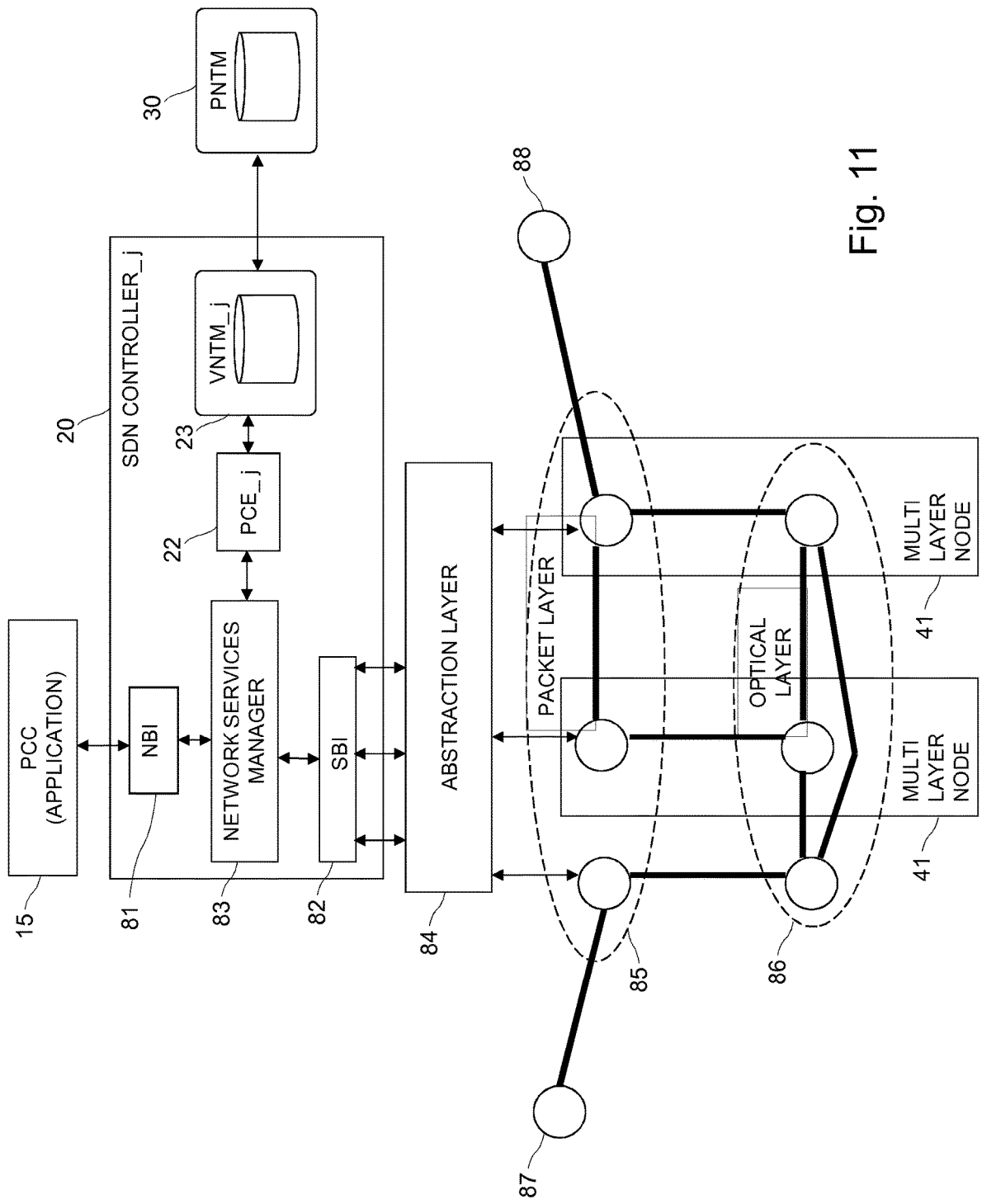
FIG. 11 shows apparatus at a tenant and network in more detail.

FIG. 11 shows an example of a communications network with an SDN controller 20. The SDN controller 20 has a northbound interface (NBI) 81 and a southbound interface (SBI) 82. The northbound interface 81 is provided to couple the NSM 83 to client application programs 15. The southbound interface 82 is provided to couple the NSM 83 to the nodes 41 of the network via an abstraction layer 84. The abstraction layer 84 provides an abstracted, standardised, interface to enable the client application programs to control the network via the NSM 83 to undertake path computation for new traffic requests. Path computation can be carried out as described above and used either for path provisioning during network operation, or during network design before installation, or for determining how best to upgrade the network by providing new capacity for example.

The communications network 71 in this example has a plurality of switching nodes 41. The nodes 41 have an electrical domain packet layer 85 and an optical layer 86. The control plane is coupled to the switching nodes which can be in the packet layer 31 or the optical layer 41. Some nodes can be hybrid nodes also called multilayer nodes 61, having switching in both layers. A number of links between nodes are shown, but a typical network would have many more. A client data end point outside the network could be an interface from a corporate intranet, or a user terminal for example, requesting traffic from a traffic source such as a remote server. The request can be managed by the NSM, and typically in cooperation with the ingress node, in this case switch 87. There are a number of possible paths between the source 87 and the destination 88, passing through packet switches and optical switches. The path computation can be extended to cover the packet layer and cover more than two layers, for example.

The multilayer nodes can for example be implemented by a Packet-Opto hybrid node that performs adaptation between MPLS-TP (MPLS Transport Profile) technology (i.e. Packet Switching Capability PSC layer) and WSON (i.e. Lambda Switching Capability LSC layer). The Packet-Opto node is a hybrid node composed by a double switching capability, that is, a Packet Switching Capability (PSC) and Lambda Switching Capability (LSC). The optical layer LSC can be constituted by an OEO ROADM (Optical-Electrical-Optical Regen-Optical-Add-Drop-Multiplexer), in which the routing of the wavelength signals coming from the transport network is performed, without any limitation due to physical impairments.

The application 15 requests the Network Service Manager (NSM), via its northbound Application Programming Interface (API), for a path which uses network resources. The NSM is a functional block of the SDN controller 20 which interacts with the northbound API 81, southbound API 82, keeps track of the finite state machines of the LSPs, and interacts with any other block of the SDN controller, like the PCE 22. The NSM asks the PCE 22 to compute a path. The PCE 22 returns a path, if any. The PCE reply is based on the current state of reserved and used resources and this state is taken to be immutable from now for all times (or until the next LSP creation or change of topology). In time aware operation according to some examples, the NSM and PCE can generate and update a future network status which can use abstracted versions of the path resources such as modelled traffic aggregation, and representations of each port or sub-port and so on. Also, current information on available capacity and costs can be assigned to each link. This can involve finding information from the nodes, or predetermined or predicted information can be assigned. There can be weighting of links according to congestion level and other criteria. As described above, the PCE 22 uses topology information in the VNTM 23 which is current. The PCE 22 returns to the NSM 83 an answer and the NSM 83 will communicate with the SBI plugins 82. In some cases, the PCE 22 may communicate directly with the SBI plugins 82.

A path request may have a specified bandwidth and quality of service for example, and then it may be appropriate to allow only links which have at least that bandwidth and quality of service available. The quality of service might be expressed in terms of reliability, availability of recovery by protection or restoration, delay parameters such as maximum delay or delay variation, and so on. The topology or graph of the network in the status can be simplified in various ways, the temporal information may be simplified, and then a graph search algorithm such as Dijkstra or other known algorithm can be applied to compare the costs of alternative links to find a lowest cost path to nodes successively further away from a starting node, until the destination node is reached. Other algorithms can include peer to peer type routing algorithms for example.

The selected lowest cost path through the virtual links of the model, is converted into a path list representing path resources in abstracted terms. This path can now be set up in the network, for example by sending the path information to the ingress node for it to send messages along the path if using the known RSVP protocol. This can involve sending a first message to the nodes requesting they reserve resources, and then a second message is returned from the egress node requesting the reserved resources be used to set up the path. Of course this can be implemented in other ways using other protocols. This can be controlled by the NSM or can be delegated to the PCE if there is a link provided directly from the PCE to the abstraction layer 84. This has been described in and IETF draft "PCEP Extensions for PCE-initiated LSP Setup in a Stateful PCE Model" (draft-ietf-pce-pce-initiated-lsp-02) which describes extensions for stateful PCE that provide stateful control of Multiprotocol Label Switching (MPLS) Traffic Engineering Label Switched Paths (TE LSP) via PCEP, for a model where the PCC delegates control over one or more locally configured LSPs to the PCE. This describes the creation and deletion of PCE-initiated LSPs under the stateful PCE model.

Some examples of time-aware applications which are emerging include the following. One kind of application is usually called "Bandwidth Calendaring" where the request for connectivity can either follow some temporal pattern (e.g. daily or weekly) or be just limited in time (e.g. from March 1st to March 31st). An example is to configure transport links to provide more bandwidth when some massive operations must be done, for example a datacentre's regular data backups. Another kind of time-aware application is called "Follow the Sun" where transport SDN will help an organization to manage traffic fluctuations due to the Earth rotation and related human activities. This is attractive for transport networks spanning vast geographical areas where working times are related to the time zones. Other examples of time-aware applications are related to efficient power management, e.g. by using network resources close to advantageous power sources like solar-powered ones or to the exploitation of the most cost-effective tariffs (just like running the washing machine when the bill is cheaper). Another example of a time-aware application is the reservation of bandwidth for events involving massive participation that will take place in the future.

Figure 12:
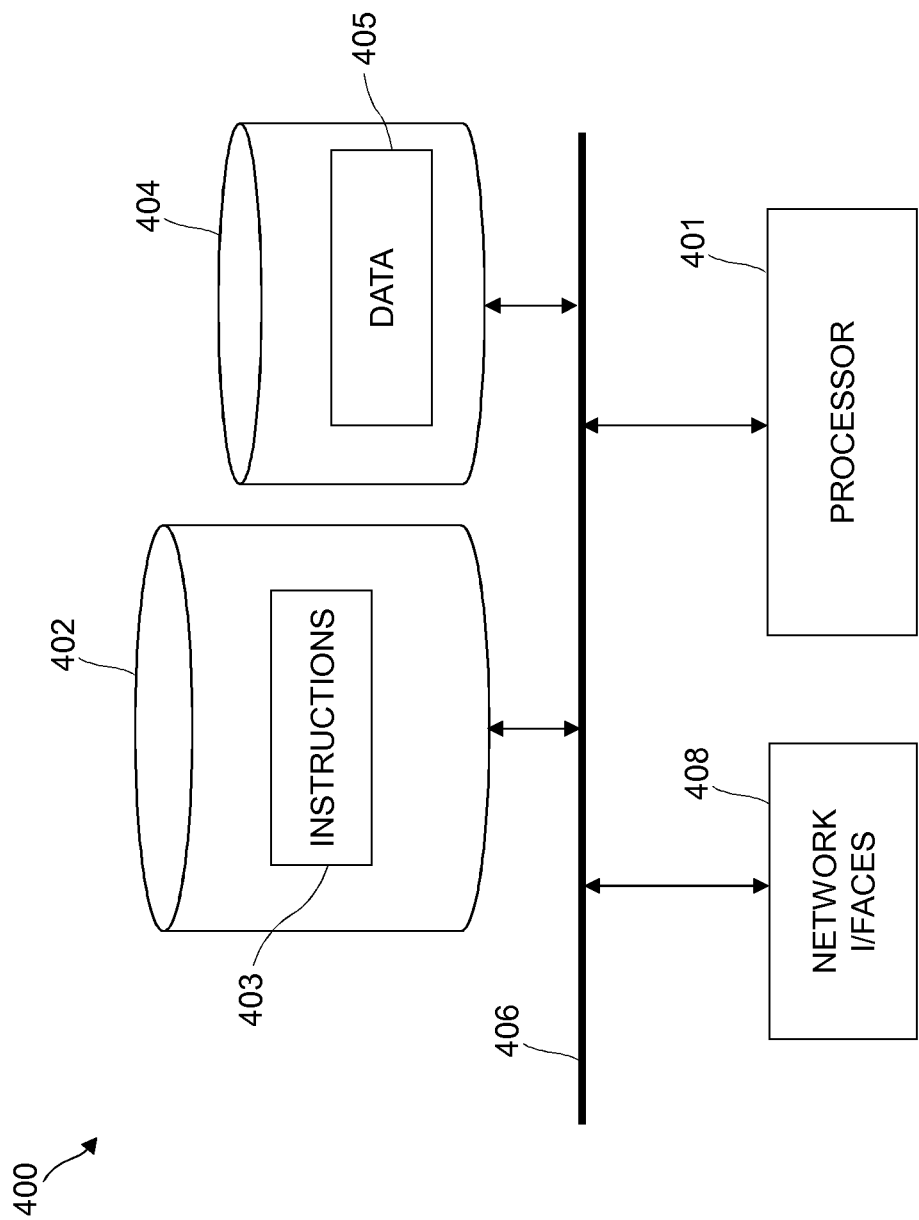
FIG. 12 shows apparatus for a computer-based implementation.

FIG. 12 shows an example of processing apparatus 400 which may be implemented as any form of a computing and/or electronic device, and in which embodiments of the system and methods described above may be implemented. Processing apparatus may implement all, or part of, the methods. Processing apparatus 400 comprises one or more processors 401 which may be microprocessors, controllers or any other suitable type of processors for executing instructions to control the operation of the device. The processor 401 is connected to other components of the device via one or more buses 406. Processor-executable instructions 403 may be provided using any computer-readable media, such as memory 402. The processor-executable instructions 303 can comprise instructions for implementing the functionality of the described methods. The memory 402 is of any suitable type such as read-only memory (ROM), random access memory (RAM), a storage device of any type such as a magnetic or optical storage device. Additional memory 404 can be provided to store data 405 used by the processor 401. The processing apparatus 400 comprises one or more network interfaces 408 for interfacing with other network entities.

The steps of the methods described herein may be carried out in any suitable order, or simultaneously where appropriate.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A path computation method for use by a control entity of a tenant in a communications network having a plurality of tenants and a topology of path resources usable for implementing paths, the method comprising:

receiving a request for computation of a path in the communications network;

based on a determination that a virtual topology of the communication network stored locally at the control entity of the tenant is not current, obtaining a current virtual topology of the communications network from a shared topology store which is shared by the plurality of tenants and which is separate from local storage at the control entity of the tenant; and using the current virtual topology to service the request, wherein the current virtual topology is a topology of the communications network that is available for use by the tenant.

2. A path computation method according to claim 1, wherein obtaining a current virtual topology of the communications network comprises requesting a current virtual topology from the shared topology store.

3. A path computation method according to claim 1, wherein obtaining a current virtual topology of the communications network comprises:

requesting an update to the virtual topology from the shared topology store; and updating the locally stored virtual topology with the update.

4. A path computation method according to claim 1, wherein obtaining the current virtual topology of the communications network comprises:

receiving an update to the virtual topology pushed from the shared topology store; and updating the locally stored virtual topology with the update.

5. A path computation method according to claim 1, wherein:

the request for computation relates to a path, in the communications network, at a future time interval; and the current virtual topology is obtained for the future time interval.

6. A path computation method according to claim 1, further comprising:

determining if the locally stored virtual topology of the communications network is current; and using the locally stored virtual topology to service the request based on a determination that the locally stored virtual topology is current.

7. A path computation method according to claim 1, further comprising initiating creation of the computed path in the communications network.

8. A path computation method according to claim 7, wherein initiating creation of the computed path comprises reserving resources for the computed path.

9. A path computation method according to claim 7, wherein initiating creation of the computed path comprises:

obtaining the current virtual topology of the communications network from the shared topology store;

checking, using the current virtual topology, that the computed path is still available.

10. A path computation method according to claim 7 wherein initiating creation of the computed path comprises:

determining if the locally stored virtual topology of the communications network is current; and one of:

using the locally stored virtual topology of the communications network if it is determined that the locally stored virtual topology is current; and obtaining the current virtual topology of the communications network from the shared topology store if it is determined that the locally stored virtual topology is not current.

11. A path computation method according to claim 7, further comprising notifying the shared topology store of the resources used by the created path.

12. A path computation method according to claim 7, wherein:

the request for computation relates to a path, in the communications network, at a future time interval; and initiating creation of the path reserves resources for the path at the future time interval.

13. A path computation method according to claim 1, wherein the virtual topology is a subset of the topology of the communications network.

14. A path computation method according to claim 1, wherein the control entity is a software-defined networking (SDN) controller for the tenant.

15. A non-transitory, computer-readable medium storing computer-executable instructions that, when executed by at least one processor associated with a control entity of a tenant in a communications network, cause the control entity to perform operations corresponding to the method of claim 1.

16. A control apparatus, of a tenant, for path computation in a communications network having a plurality of tenants and a topology of path resources usable for implementing paths, the control apparatus comprising at least one processor and at least one memory storing computer-executable instructions that, when executed by the at least one processor, configure the control apparatus to:

receive a request for computation of a path in the communications network;

based on a determination that a virtual topology of the communication network stored locally at the control entity of the tenant is not current, obtain a current virtual topology of the communications network from a shared topology store which is shared by the plurality of tenants and which is separate from local storage at the control entity of the tenant; and use the current virtual topology to service the request, wherein the current virtual topology is a topology of the communications network that is available for use by the tenant.

17. A control apparatus according to claim 16, wherein execution of the instructions further configures the control apparatus to obtain the current virtual topology of the communications network by requesting the current virtual topology from the shared topology store.

18. A control apparatus according to claim 16, wherein the control apparatus is arranged as a software-defined networking (SDN) controller for the tenant.

19. A communications system comprising:

a communications network having a topology of path resources usable for implementing paths, the communications network being usable by a plurality of tenants;

a shared topology store which is shared by the plurality of tenants and which is separate from local storage at the control entities of the respective tenants; and a control apparatus, according to claim 16, for a tenant of the communications network.

* * * * *